Feb. 9, 1943.                H. C. CHRISTIAN                2,310,615
                                AXLE PULLER
                            Filed April 21, 1941
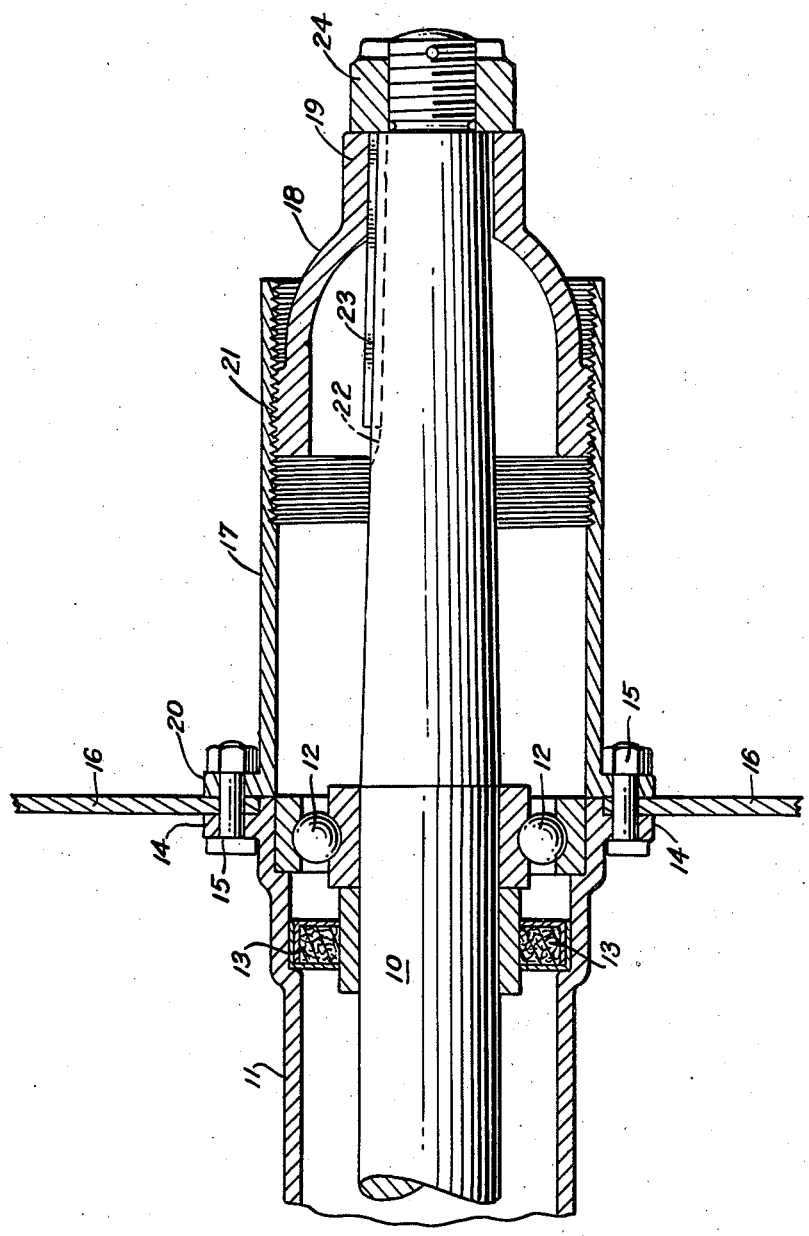
INVENTOR.
HENRY C. CHRISTIAN
BY
Castberg + Roemer
ATTORNEYS Patented Feb. 9, 1943

2,310,615

UNITED STATES PATENT OFFICE 2,310,615

AXLE PULLER

Henry C. Christian, Berkeley, Calif., assignor of one-half to Elmer W. Stryker, Albany, Calif.

Application April 21, 1941, Serial No. 389,556

2 Claims. (Cl. 29—86.1)

The present invention relates to axle pullers, and particularly to devices for pulling or removing the rear axles of an automobile.

It frequently becomes necessary to remove the rear axle of a motor vehicle to replace the grease retainer which serves to prevent differential grease from passing from the rear axle housing out toward the hub of the wheel and brake mechanism, or to make other replacements or repairs. Most devices designed for the purpose of removing the rear axle, which is usually quite firmly held against removal by friction, are designed to depend upon a blow or shock to dislodge the axle.

It is the object of the present invention to provide a device which will remove the rear axle of a vehicle without in any manner striking or imparting shock to it, and it is a further object of the invention to provide an axle puller which will remove the rear axle of a vehicle by force transmitted through rotary movement of the axle itself, so that power originating from the starting motor or from the main motor of the vehicle may be employed to effect such removal.

Other and more specific objects of the invention will be made apparent in the following specification, wherein reference is made to the accompanying drawing.

The drawing illustrates the outer end of the rear axle of an automobile with a portion of the outer end of the rear axle housing illustrated in section, and also shows the application thereto of an axle puller constructed in accordance with the present invention.

Referring to the drawing in detail, the axle is illustrated at 10 as extending through and beyond the outer end of a rear axle housing 11. The axle is conventionally supported with relation to the housing by means of any suitable bearing indicated here as a ball bearing 12 and a grease retainer 13 is shown as positioned behind the ball bearing for the purpose of preventing differential grease from flowing from the differential housing into the hub of the wheel which is mounted on the axle. The inner end of the axle 10 is of course connected with one of the small bevelled gears of the differential by the conventional spline or the like, which will permit of its being withdrawn from the housing upon the application of sufficient force in a direction longitudinal of the axle. The outer end of the rear axle housing 11 is shown as provided with the usual flange 14 through which flange pass a number of bolts 15. A dust shield or brake drum 16 is generally mounted adjacent the flange 14 and secured thereto by the bolts 15, which also serve to hold the wheel assembly in place.

The present invention includes, as shown in the drawing, a cylinder 17, a retracting member 18, and a key 19. The cylinder 17 is secured in a concentric position relative to the outer end of the axle 10 by means of the bolts 15 which pass through suitable perforations in a flange 20 formed on the inner end of the cylinder, and the nuts of these bolts are employed to hold the cylinder firmly in this position. The retracting member 18 has its inner end enlarged and threaded as at 21 to the interior of the outer end of the cylinder 17. The outer end of the retracting member 18 which is reduced in size is provided with a key-way which may be caused to register with a key-way 22 which is conventionally formed in the outer tapered end of the axle so that a key 23 may be employed to prevent relative rotation between the retracting member 18 and the axle 10. A nut 24 which may be the nut normally used on the outer end of the axle to hold the wheel assembly in place is employed to prevent endwise removal of the retracting member 18 and also to prevent the key 23 from slipping out of its position in the key-way.

With the parts assembled in the manner here shown and described, the axle 10 will be retracted by its own rotation. This retraction will be effected upon rotation of the axle which will, through the key 23, also effect rotation of the retracting member 18. As the retracting member 18 has a threaded connection with the interior of the non-rotatable cylinder 17, it will advance longitudinally of the axle and, assuming the rotation to be in the right direction, will because of its abutting relation with the nut 24, threaded to the outer end of the axle, remove the axle from its position within the axle housing, it being understood that the application of force for this purpose is necessary only to dislodge the axle, or, in other words, to move it a fraction of an inch, which overcomes the initial friction tending to retain the axle against dislodgement. After this, the axle may easily be removed by hand.

In order to rotate the axle to cause its removal, it is simply necessary to close the switch to the starting motor with the transmission of the automobile in gear, and it is entirely unnecessary to impart a blow at any part of the axle to effect its dislodgement.

As the two axles of the automobile must be rotated in opposite directions in order to effect longitudinal movement of the retracting member outwardly, it is simply necessary on one axle to place the transmission in low gear before closing the starting switch, and on the other axle to place the transmission in reverse gear before closing the starting switch. Assuming the right rear axle to be the one which is to be removed, and assuming the threads 21 which connect the retracting member 18 with the cylinder 17 to be left-hand threads, the transmission will be placed in low gear, or, on the other hand, in reverse gear, in case of removing the left rear axle. The right axle, however, is the one most frequently removed on most vehicles, possibly because of its wheel coming against the road curb and thus being subjected to greater abuse than the other; and for this reason it is desirable that the threads 21 be left-hand threads so that the device can more often be used in low gear. It will, however, function quite as well with a right-hand thread if the arrangement of the gears as above described is reversed.

While the invention is herein described and illustrated more or less specifically for the purpose of making clear its general principles, it is to be understood that various changes may be resorted to in the arrangement and construction of its several parts, all within the scope of the appended claims.

Having thus described my invention, what I claim and desire to secure by Letters Patent is:

1. A device for pulling the rear axle of an automobile comprising a cylindrical member adapted to surround the outer end of the axle and adapted to be secured against rotation to the axle housing, a retracting member having a threaded connection with the interior of said cylindrical member and having an opening to receive the outer end of the axle, said opening having a key-way to register with the axle key-way whereby a key may be inserted to prevent relative rotation between the retractor and the axle, and said retractor having a shoulder for abutment with a nut threaded on the end of the axle.

2. An axle puller adapted for pulling a power driven axle from its housing comprising a cylindrical member arranged concentrically around the outer end of an axle to be pulled, means to secure said member to a housing and to thereby hold the same against rotation and longitudinal movement, a second member, means to fix the second member to the axle against movement with respect thereto, and a threaded connection between said members whereby when power is applied for rotation of the axle, the second member will be rotated and said threaded connection will act to advance said second member and thereby exert a longitudinal pull on the axle.

HENRY C. CHRISTIAN.